United States Patent [19]

Lange

[11] 4,145,128
[45] Mar. 20, 1979

[54] DEVICE FOR CONTROLLING A CAMERA TIMING MEANS AS A FUNCTION OF FILM SPEED

[75] Inventor: Karl H. Lange, Bünde, Fed. Rep. of Germany

[73] Assignee: Balda-Werke Photographische Gerate und Kunststoff GmbH & Co. KG, Bünde, Fed. Rep. of Germany

[21] Appl. No.: 816,328

[22] Filed: Jul. 18, 1977

[30] Foreign Application Priority Data

Feb. 10, 1977 [DE] Fed. Rep. of Germany ... 7703901[U]

[51] Int. Cl.² .............................................. G03B 7/18
[52] U.S. Cl. ........................................ 354/21; 354/59
[58] Field of Search ................... 354/21, 23 R, 58, 59, 354/56, 288; 352/72

[56] References Cited

U.S. PATENT DOCUMENTS

| 3,568,581 | 3/1971 | Heinzmann et al. | 354/21 |
| 3,602,117 | 8/1971 | Eagle et al. | 354/21 |
| 3,667,362 | 6/1972 | Neudecker et al. | 354/21 |
| 4,055,846 | 10/1977 | Yamanaka et al. | 354/21 |

*Primary Examiner*—Michael L. Gellner
*Attorney, Agent, or Firm*—Howard I. Schuldenfrei

[57] ABSTRACT

A film cartridge loading type camera is provided with improved apparatus for controlling camera exposure comprising a sensing slide for sensing a film speed code carried on a film cartridge, and a pivotable lever operatively connected to the sensing slide which is responsive to latching of the camera housing after mounting the film cartridge thereon. The operative connection between the pivotable lever and sensing slide is a variable function of the film speed of the cartridge load. A regulable intermediately mounted bell crank and lever arrangement integrally connected to the sensing slide control the position of a camera exposure regulating member.

9 Claims, 9 Drawing Figures

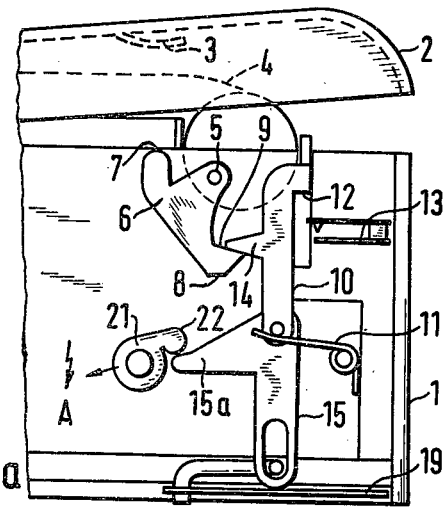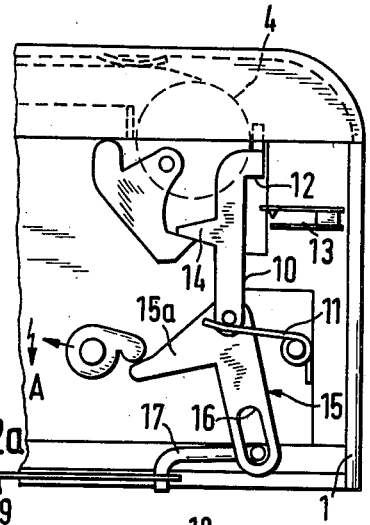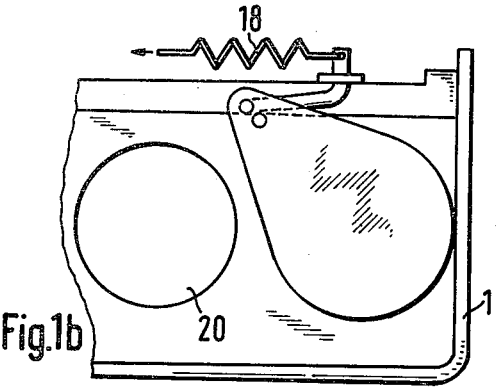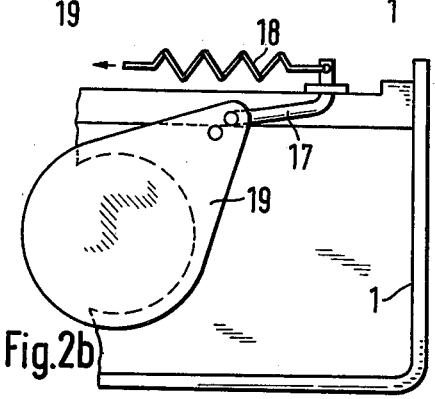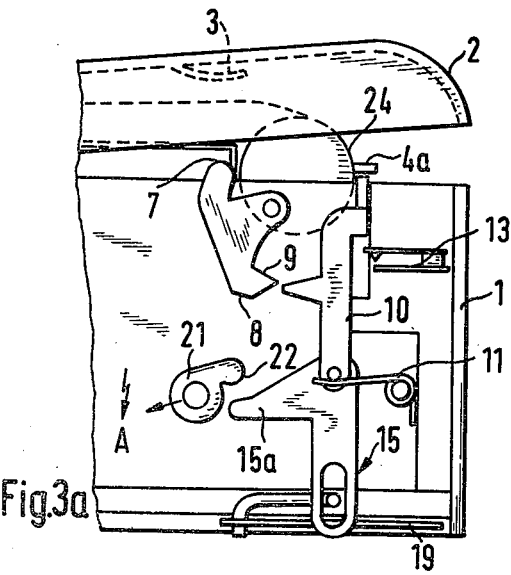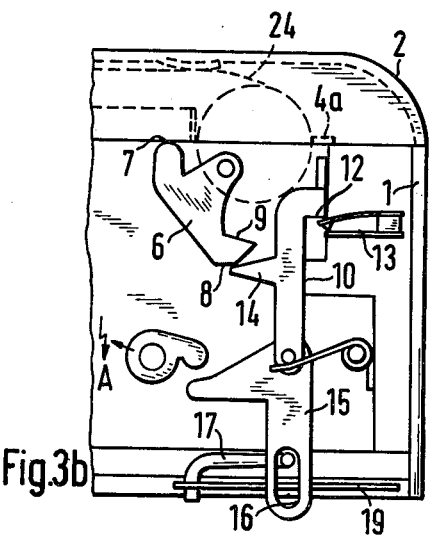

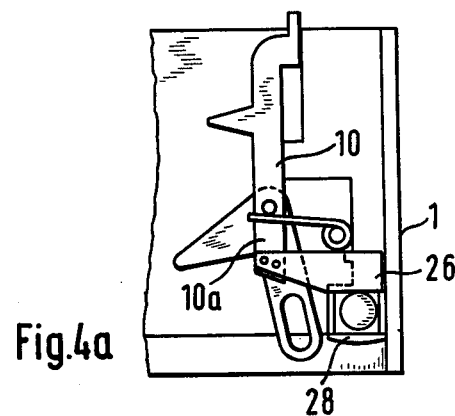
Fig.4a
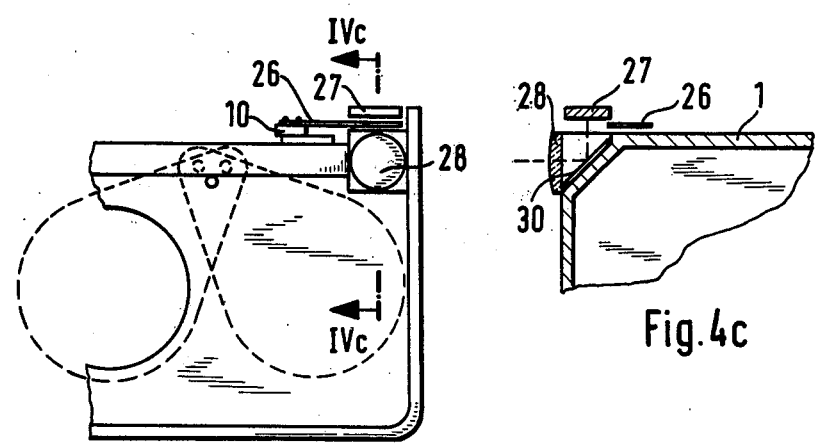
Fig.4b
Fig.4c

DEVICE FOR CONTROLLING A CAMERA TIMING MEANS AS A FUNCTION OF FILM SPEED

BACKGROUND OF THE INVENTION

The instant invention relates generally to a cartridge loading camera, and more particularly to a device for a cartridge loading camera which functionally relates a camera timing means, housed in such a camera, to cartridge film speed, whereby film cartridges of various film speeds may be employed in the camera under a multiplicity of conditions.

Such devices are heretofore known in the art. For instance, U.S. Pat. No. 4,000,497 to Floyd M. Galbraith, Jr., issued Jan. 11, 1977 discloses cooperable first and second levers displaceably mounted in parallel planes perpendicular to the plane of film loaded in the camera housing. The first lever, which may be characterized as a sensing slide, is weakly spring biased towards the plane of the film unil it abuts a film marker, for instance a marking rib of the type provided on a film cartridge to indicate film speed. The bias on the sensing slide is opposite in direction to the bias on the film cartridge, provided by leaf springs mounted in the camera housing. The force exerted by the sensing slide on the film cartridge, therefore, undesirably tends to unseat the cartridge, causing unwanted displacement of the film plane, which is particularly undesirable when a subminiature camera is employed, and resulting in photographs lacking definition.

To overcome this cartridge unseating problem, the '497 patent employs means which may removably displace a light-attenuating means, such as a filter, to a position overlying the photosensitive element of the camera timing means. This is accomplished by employing the separate, second lever which, with specific cartridges, pivots a spring-loaded pivotally mounted lever for slidably moving the light-attenuating means to its position overlying the photosensitive element. The film-sensing slide serves, in the case of this known construction, to pivot the pivotable lever from its first or normal position to its second position for the second lever to act thereon.

This prior device is, however, relatively expensive, and somewhat delicate because it includes a multiplicity of moving parts. Additionally, the juxtaposition of elements in this device requires the provision of a force acting counter to the direction of the bias on the film cartridge, and this force may not be considered negligible. The tension on the spring connected to the film sensing slide must be at least strong enough for the sensing slide to pivot the spring-loaded pivotally mounted lever from a first position to a second position in the path of the second lever. Therefore, the bias on the film sensing slide must be sufficient to counteract the force of restoration on the pivotally mounted lever. In addition thereto, the restoration force of the spring connected to the film sensing slide must be so dimensioned to permit displacement of the light-attenuating means, in opposition to the return spring acting thereon, by an amount corresponding to the pivot angle of the pivotable lever as it pivots between its normal or first position and its second position in the path of the second lever.

Another prior device which is more complex than the device heretofore described is disclosed in Patent 4,003,062 to Floyd M. Galbraith and comprises a linkage apparatus having three cooperating elements; a first element moved when a flash unit is mounted on the camera, an intermediate element whose movement follows the movement of the first element, and when moved positions a filter into or out of the path of a lens, and a third element that carries the filter, senses the film speed on the encoded cartridge, and couples film speed with a sense of whether or not a flash unit is mounted on the camera. While this device overcomes the problem inherent in the construction heretofore described, it does so at substantial expense with a delicate network of interlocking elements.

Accordingly, the instant invention provides a device which represents an improvement over the former type device described herein wherein the film sensing slide does not exert any force upon the film cartridge opposite to the bias on the cassete, no matter what speed film is loaded in the camera housing.

SUMMARY OF THE INVENTION

Generally speaking, in accordance with the invention, a film cartridge loading type camera is provided with improved apparatus for controlling camera exposure regulating means comprising sensing means for sensing a film speed code carried on a film cartridge, and means operatively connected to the sensing means which is responsive to latching of the camera housing after mounting the film cartridge thereon. The operative connection between the means and sensing means is a variable function of the film speed of the cartridge load. Regulable intermediate means integrally connected to the sensing means control the position of the camera exposure regulating means.

Accodingly, it is an object of this invention to provide a film cartridge loading type camera with improved means for controlling camera exposure regulating means.

Another object of the invention is to provide means for controlling camera exposure means for a film cartridge loading type camera having an improved construction.

A further object of the invention is to provide a camera exposure regulating means with improved control means which do not reorient the normal plane of film mounted in the camera.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1a is a sectional top view of an improved apparatus for controlling camera exposure regulating means constructed in accordance with the instant invention which is mounted in a conventional film cartridge loading type camera, having a daylight setting, and blank coded cartridge mounted therein;

FIG. 1b is a sectional front view of the embodiment seen in FIG. 1a, showing the position of the neutral density filter in the elemental juxtaposition seen in FIG. 1a;

FIG. 2a is a sectional top view corresponding to FIG. 1a showing a flash unit setting for the apparatus;

FIG. 2b is a sectional front view corresponding to FIG. 1b showing the position of the neutral density filter in a flash unit setting for the apparatus;

FIG. 3a is a sectional top view corresponding to FIG. 1a, but showing the camera with an encoded film cartridge;

FIG. 3b is a sectional top view showing the position of elements seen in FIG. 3a when the camera is set for a flash unit;

FIG. 4a is a fragmentary detail showing an alternative embodiment of the apparatus for a film cartridge loading type camera with electronic timing controls and photosensor;

FIG. 4b is a detail view showing corresponding first and second positions of the neutral density filter in the alternative embodiment seen in FIG. 4a; and FIG. 4c is a sectional view taken along line IVc—IVc of FIG. 4b.

DETAILED DESCRIPTION OF THE INVENTION

Film cartridge load type still cameras, as utilized herein, are well known, therefore the intant description is direction in particular to elements forming part of or cooperating more directly with the present invention, and camera elements not specifically shown or described herein are understood as being selectable from those known in the art.

Referring now to the drawings, and more particularly to FIGS. 1a-3b thereof, the camera includes a housing 1 having a rear cover 2 hingedly connected thereto. Mounted on the interior surface of the rear cover 2 are a plurality of leaf springs 3 which releasably bias a coded film cartridge into predetermined position within housing 1 upon closure of rear cover 2.

Closure of rear cover 2 sets the improved control means of this invention according to the film speed code of the cartridge mounted in housing 1, as hereinafter set forth. This improved control means includes, generally, a sensing slide 10 which senses and responds to the speed code on the cartridge, a pivotable lever 6 variably engageable with sensing slide 10, and a bell crank lever 15 connected to the sensing slide which is pivotable between first and second positions for correspondingly sliding a neutral density filter 19 across the optical path of camera lens 20.

Sensing slide 10 comprises a lever slidably mounted in a groove in housing 1 on an upwardly extending finger connected to shoulder 12 thereof. A leg spring 11 connected to housing 1 biases lever 10 normally upwardly, positioning the finger thereon in specific spaced relationship to the film cartridge, for thereby sensing the film speed code thereon.

By comparison between the cartridge 4 seen in FIG. 1a and the cartridge 24 seen in FIG. 3a, the different film speed codes borne on the two cartridges may be observed. By contrast, the cartridge 4 bears a blank code marking, designating, for instance, a 27 DIN film speed, while the cartridge 24 bears a rib 4a as a code marking which designates, for instance, a 21 DIN film speed. Sensing the blank code on cartridge 4, sensing slide 10 remains in its upwardly biased normal position as rear cover 2 is latched over a cartridge 4 mounted in housing 1. When, however, a cartridge 24 is mounted in housing 1 and rear cover 2 is closed thereover, rib 4a thereof engages the finger of sensing slide 10 and sensing slide 10 is depressed downwardly against the bias of leg spring 11.

The normal and depressed positions of sensing slide 10 are respectively supported by pivotable lever 6 which is pivoted, upon closure of rear cover 2, into supporting engagement with opposite cammed surfaces, corresponding respectively to the normal and depressed positions of sensing slide 10, provided on a tapered nose 14 extending laterally from sensing slide 10 into the arcuate path of lever 6. Lever 6 is pivotably mounted on housing 1 and includes a finger 7 extending normally into the cartridge receiving area of the housing 1 and a pawl-like member substantially opposite finger 7 having an upper supporting surface 9 and a lower depressing surface 8 which are respectively engageable with the corresponding surfaces provided on tapered nose 14 of sensing slide 10. As rear cover 2 is latched over a film cartridge onto housing 1, lever 6 is pivoted counterclockwise towards sensing slide 10, as seen in the drawings, as finger 7 is abutted by the cartridge casing. When sensing slide 10 is in the position seen in FIGS. 1a and 1b, supporting surface 9 of lever 6 engages the lower surface of tapered nose 14, while depressing surface 8 of lever 6 engages the upper surface of tapered nose 14 when sensing slide 10 is in the position seen in FIGS. 3a and 3b.

Pivotably connected to the front end of sensing slide 10 is bell crank lever 15 having an elongated longitudinal slot 16 in the forward arm thereof into which an end of a spring biased configured rod 17 freely extends. Rod 17 has another end connected to a neutral density filter 19, which is reciprocable between a normal first position seen in FIG. 1b and a second position seen in FIG. 2b overlying objective lens 20. The bias on rod 17 is provided by a tension spring 18 having an end connected thereto and another end connected to housing 1.

When a film cartridge 4 is mounted in housing 1, a trigger 15a provided on bell crank lever 15 is positioned within striking distance of a finger 22 connected to a rotatable setting member 21, as seen in FIGS. 1a and 2a, that is rotatable between the first and second positions seen in FIGS. 1a and 2a. Sensing slide 10 and bell crank lever 15 are substantially linearly aligned when setting member 21 is in the first position seen in FIG. 1a, and neutral density filter 19 is correspondingly pivotably displaced to its first or normal position distal from lens 20, as seen in FIG. 1b. When setting member 21 is rotated to its second position, as seen in FIG. 2a, finger 22 thereof pivotably displaces bell crank lever 15 as it abuts trigger 15a thereof, and concomitantly, as the forward arm of bell crank lever 15 is displaced so is rod 16 as it is abutted by the side wall defining slot 16 in bell crank lever 15. The displacement force exerted on rod 17 by bell crank lever 15 exceeds the force of tension spring 18, and neutral density filter 19 is pivoted from its first position to its second position overlying lens 20, as seen in FIG. 2b.

Neutral density filter 19 is rotatably mounted on a pin connected to housing 1, the rotatable mounting of the filter being below the connection between rod 17 and the filter. As rod 17 is linearly displaced, filter 19 is rotated between first and second positions.

With reference now to FIGS. 3a and 3b it may be seen that when a cartridge 24 is mounted in housing 1, trigger 15a is depressed beyond striking distance of finger 22 of the setting member 21, sensing slide 10 and bell crank lever 15 remain substantially aligned, and while the relative position of rod 17 in slot 16 is displaced rearwardly, rod 17 is still free standing in slot 16. Whatever position may be given setting member 21, filter 19 remains in its first position seen in FIG. 1b, when a film cartridge 24 is employed in the camera.

Referring generally to FIGS. 1a-3b it may be seen that a normally open two position switch 13 is mounted in housing 1 with the contact thereof extending into the path of shoulder 12 provided on sensing slide 10. Switch 13 is a switch in the conventional electrical shutter timing control circuit. Such shutter timing control circuits, as well as their installation in a camera of the type herein disclosed, are well-known in the art. Referring now particularly to FIGS. 3a and 3b, it may be seen that as sensing slide 10 is depressed downwardly by a cartridge 24 and lever 6, shoulder 12 abuts the contact of switch 13 moving switch 13 to its on position influencing the shutter control circuit. Switch 13 in the electrical shutter timing circuit may be replaced with conventional means, such as means for controlling the quantity and intensity of light reaching the photosensor means.

In practice, a film cartridge 4, for instance of 27 DIN film, may be loaded in housing 1 underlying rear cover 2. As rear cover 2 is latched to housing 1, leaf springs 3 suitably position cartridge 4 in housing 1. The rear cover 2 pivots lever 6 into engagement with sensing slide 10. Cartridge 4 having a blank code, lever 6 is pivoted into supportive engagement with sensing slide 10. By comparison between FIGS. 1a and 3a it may be seen that the cartridge code is mounted on a spool which is advanced into the housing before the cartridge main body. Therefore, the position of sensing slide 10 is determined by the cartridge code before lever 6 is pivoted by the cartridge main body into engagement with sensing slide 10. The releasable coupling between lever 6 and sensing slide 10 substantially reinforces the normal bias on sensing slide 10 provided by leg spring 11.

FIGS. 1a and 1b show the juxtaposition of elements for daylight picture taking with, for instance 27 DIN film. The setting member 21 is set in the A position, as seen in FIG. 1a, and filter 19 is withdrawn from the optical path of lens 20, as seen in FIG. 1b. For flash photographs, setting member 21 is rotated to the flash setting seen in FIG. 2a whereby finger 22 thereof abuts into trigger 15a pivoting bell crank lever 15 and transposing the juxtaposition of elements to the conformation seen in FIG. 2a. Concomitantly, filter 19 is drawn across the optical path of lens 20 as seen in FIG. 2b.

When a cartridge 24, for instance, of 21 DIN film having a rib code 4a thereon for speed designation is substituted for cartridge 4, sensing slide 10 is depressed relative to its normally biased position by the pressure of rib 4a, as seen in FIG. 3a. As rear cover 2 is latched over cartridge 24, lever 6 is pivoted into engagement with lever 10, further depressing sensing slide 10 relative to its norm, until shoulder 12 thereof moves switch 13 to its on position thereby influencing the shutter timing circuit. Trigger 15a is removed relative to setting member 21, as seen in FIG. 3b, when pivoted to either position, since filtering is unrequired with this speed film. Therefore, setting of member 21 to positions A or flash is inoperative for the purpose of shifting filter 19 from the position seen in FIG. 1b.

It is a particularly significant feature of this invention that the film plane remains stable no matter what speed film is housed in the cartridge mounted in the housing 1. The only force exerted upon the cartridge, once fully enclosed within housing 1, is provided by leaf springs 3. Sensing slide 10 and lever 6 cooperatively interact to relieve pressure on the film cartridge as seen in FIGS. 2a and 3b.

Referring now to FIGS. 4a-4c, means are disclosed which provide an alternative to the electrical shutter timing means hereinbefore described. According to this embodiment, sensing slide 10 includes a coplanar extension 10a on which a light reductive filter 26 is laterally mounted. When a film cartridge 24 is mounted and enclosed within housing 1, filter 26 is depressed to coincidentally overly a photosensor 27 mounted in housing 1. Light is transmitted to photosensor 27 through a lens 28 and mirror 30, as seen in FIG. 4c. As best seen in FIGS. 4b and 4c, filter 26 is movable between mirror 30 and photosensor 27 for reducing the light reflected into photosensor 27. Filter 26 remains in the position seen in FIG. 4a, withdrawn from the optical path of lens 27, when a cartridge 4 is mounted in housing 1. Like numbered elements shown in these figures and described in connection with the embodiments hereinbefore described in detail function identically.

It will thus be seen that the objects set forth above, among those made apparent from the preceeding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved apparatus for conrolling camera exposure regulating means including an activatable neutral density filter and electrical shutter timing control means or equivalent mechanical means for a rear loading film cartridge type camera which accepts speed coded film cartridges, said apparatus comprising a sensing means slidably mounted in the camera housing for sensing the speed code on a film cartridge, pivotable means cooperable with said sensing means for finally positioning said sensing means, said pivotable means being operatively responsive to enclosure of the film cartridge in the camera housing, said pivotable means including a first supportive surface and a second depressing surface, said pivotable means being engageable with said sensing means along said first or second surface thereof corresponding to the position of said sensing means, said first surface of said pivotable means engaging said sensing means when said sensing means is in a corresponding position, said second surface of said pivotable means engaging said sensing means when said sensing means is in a corresponding position and regulable intermediate means responsive to said sensing means for regulating the disposition of the neutral density filter between inactive and active exposure regulating positions.

2. The improved apparatus as claimed in claim 1, said sensing means having a normally biased first position proximate the speed code on the film cartridge, and being depressible to a second position distal from the speed code on the film cartridge, said improved apparatus including a biasing means for biasing said sensing means into its first position.

3. The improved apparatus as claimed in claim 2, including switching means mounted in the camera housing between said first and second positions of said sensing means and in the path thereof, said switching means having open and closed positions, said open and closed positions of said switching means corresponding respectively to open and closed shutter timing control circuits, said switching means being movable from its first to second positions by said sensing means, as said sensing means is depressed from its first to second positions.

4. The improved apparatus as claimed in claim 2, said regulable intermediate means comprising lever means pivotably connected to said sensing means, said lever means being pivotable from a first normal position to a second angular position when said sensing means is in its first position, a connecting means for connecting the neutral density filter to said lever means, the neutral density filter being movable from inactive to active positions as said lever means is pivoted from its corresponding first to second positions, and a discrete means for pivoting said lever means.

5. The improved apparatus as claimed in claim 4, said regulable intermediate means further including biasing means connected to said connecting means for normally biasing said neutral density filter to an inactive position.

6. The improved apparatus as claimed in claim 4, said discrete means being unengageable with said lever means when said sensing means is in its second position.

7. The improved apparatus as claimed in claim 2, including photosensory means mounted in the camera housing coincidental with said second position of said sensing means, and a light reduction filter movable with said sensing means to an active position overlying said photosensory means for thereby regulating the camera shutter timing control.

8. The improved apparatus as claimed in claim 7, said photosensory means including a light transmissive lens mounted in the camera housing, a photosensor lying in a plane substantially normal to the plane of said lens, and a reflective mirror angularly oriented between said lens and said photosensor for reflecting light transmitted by said lens to said photosensor.

9. The improved apparatus as claimed in claim 1 including biasing means mounted on the housing for biasing the film cartridge and positioning the film in a plane parallel to the camera objective lens.

* * * * *